(12) United States Patent
Parker et al.

(10) Patent No.: US 11,708,307 B2
(45) Date of Patent: Jul. 25, 2023

(54) COMPOSITION TO COMPLETELY OR PARTIALLY REPLACE BALL CLAY IN CERAMICS, METHOD OF MAKING, AND USE THEREOF

(71) Applicant: ACTIVE MINERALS INTERNATIONAL, LLC, Sparks, MD (US)

(72) Inventors: Dennis Clay Parker, Sparks, MD (US); Robert J. Purcell, Jr., Sparks, MD (US); Matthew J. Lyman, Sparks, MD (US); Donald Keith Mills, Sparks, MD (US); John W. Kitchens, Sparks, MD (US); Charles Pettit, Sparks, MD (US); James Cutright, Sparks, MD (US)

(73) Assignee: Active Minerals International, LLC, Sparks, MD (US)

(*) Notice: Subject to any disclaimer, the term of this patent is extended or adjusted under 35 U.S.C. 154(b) by 9 days.

(21) Appl. No.: 17/215,331

(22) Filed: Mar. 29, 2021

(65) Prior Publication Data

US 2021/0221740 A1 Jul. 22, 2021

Related U.S. Application Data

(62) Division of application No. 16/610,164, filed as application No. PCT/US2018/030856 on May 3, 2018, now Pat. No. 11,198,646.

(Continued)

(51) Int. Cl.
C04B 33/04 (2006.01)
C04B 33/13 (2006.01)
C04B 33/30 (2006.01)

(52) U.S. Cl.
CPC .......... *C04B 33/04* (2013.01); *C04B 33/1305* (2013.01); *C04B 33/30* (2013.01)

(58) Field of Classification Search
CPC ..... C04B 33/04; C04B 33/1305; C04B 33/30; C04B 14/102; Y02P 40/60
See application file for complete search history.

(56) References Cited

U.S. PATENT DOCUMENTS 3,573,944 A * 4/1971 Gebura .................... C08K 9/08
524/789
2006/0009348 A1 ‡ 1/2006 Sare ..................... C04B 35/6263
501/141

(Continued)

FOREIGN PATENT DOCUMENTS

CN 1821075 A 8/2006
CN 1821075 A ‡ 8/2006

(Continued)

OTHER PUBLICATIONS

CN104609830A machine translation (Year: 2015).*

(Continued)

*Primary Examiner* — Karl E Group
*Assistant Examiner* — Cameron K Miller
(74) *Attorney, Agent, or Firm* — Pilloff Passino & Cosenza LLP; Sean A. Passino; Rachel K. Pilloff

(57) ABSTRACT

A composition comprises at least one form of attapulgite present in a solid weight fraction amount ranging from 0.25% to 5%; kaolin present in a solid weight fraction amount ranging from 17% to 50%; and optionally Ball Clay in a solid weight fraction amount ranging from 0% to 25%. Although makeable by other processes, in some embodiments, the composition is makeable by mixing component ingredients. Although usable for other purposes, in some embodiments, the composition is used to make ceramic pieces, e.g., via casting, pressing, jiggering or jollying, (Continued)

Table 1 Component Key

| BCF | BCC | KD | KF | K6 | AG | A4 | Q | F |
|---|---|---|---|---|---|---|---|---|
| Fine Ball Clay | Coarse Ball Clay | Fine Kaolin | Coarse Kaolin | Functional Kaolin | Purified Attapulgite | Processed Attapulgite | 200 Mesh Quartz | 200 Mesh Feldspar | especially when the slip has solids, chemistry and viscosity suitable for shaping before drying, sintering, and optionally finishing.

20 Claims, 3 Drawing Sheets

Related U.S. Application Data

(60) Provisional application No. 62/647,657, filed on Mar. 24, 2018, provisional application No. 62/502,032, filed on May 5, 2017.

(56) References Cited

U.S. PATENT DOCUMENTS

| | | | | |
|---|---|---|---|---|
| 2014/0119841 A1 ‡ | 5/2014 | Purcell, Jr | ................ | B09B 1/00 406/197 |
| 2015/0239782 A1 ‡ | 8/2015 | Purcell, Jr | ............... | C04B 28/02 106/713 |

FOREIGN PATENT DOCUMENTS

| | | | | | |
|---|---|---|---|---|---|
| CN | 1980870 | A | | 6/2007 | |
| CN | 1980870 | A | ‡ | 6/2007 | ........... C04B 33/025 |
| CN | 102153329 | A | | 8/2011 | |
| CN | 104609830 | | ‡ | 5/2015 | |
| CN | 104609830 | A | * | 5/2015 | |
| CN | 104725030 | | ‡ | 6/2015 | |
| CN | 104725030 | B | ‡ | 6/2016 | |
| CN | 104725030 | B | | 6/2016 | |
| CN | 105884332 | | ‡ | 8/2016 | |
| CN | 105884332 | A | * | 8/2016 | |
| CN | 105884332 | A | | 8/2016 | |
| CN | 104609830 | B | | 1/2017 | |
| CN | 104609830 | B | ‡ | 1/2017 | |
| GB | 1231178 | | ‡ | 5/1971 | |
| WO | 2014049189 | A1 | | 4/2014 | |
| WO | WO-2014049189 | A1 | ‡ | 4/2014 | ............. C04B 33/13 |
| WO | 2017039943 | A1 | | 3/2017 | |
| WO | WO-2017039943 | A1 | ‡ | 3/2017 | ............... C05B 9/00 |

OTHER PUBLICATIONS

CN105884332A machine translation (Year: 2016).*
International Search Report & Written Opinion for PCT/US2018/030856, dated Jul. 9, 2018.‡
Office action for related India application No. 201947044723, dated Mar. 31, 2021.‡
Extended European search report for European Patent Application No. EP18795133.0, dated Dec. 22, 2020.‡
Office action for related China application No. 2018800299560, dated Sep. 1, 2021.‡
Office action for related Indonesian application No. P00201911107, dated Jun. 21, 2021.‡
Office action for Vietnam Application No. 1-2019-06726, dated Feb. 24, 2022.
Notification to Grant Patent for China Application No. 2018800299560, dated Mar. 7, 2022.
Office action for Japan Application No. 2020-511738, dated Apr. 5, 2022.
Office action for Chinese Application No. 202210551456.1, dated Dec. 26, 2022.
Office action for EP Application No. 18 795 133.0, dated Nov. 4, 2022.

\* cited by examiner
‡ imported from a related application

FIGURE 1

Table 1 Component Key

| BCF | BCC | KD | KF | K6 | AG | A4 | Q | F |
|---|---|---|---|---|---|---|---|---|
| Fine Ball Clay | Coarse Ball Clay | Fine Kaolin | Coarse Kaolin | Functional Kaolin | Purified Attapulgite | Processed Attapulgite | 200 Mesh Quartz | 200 Mesh Feldspar |

FIGURE 2

Table 2 Components of Three Formulations

| Formula | Components | | | | | | | | | |
|---|---|---|---|---|---|---|---|---|---|---|
| | BCF | BCC | KD | KF | K6 | AG | Q | F | Plastic | Non-Plastic |
| Control A | 13.0% | 21.0% | | 17.0% | | | 11.0% | 38.0% | 51% | 49% |
| X-5 | | | 9.0% | 21.0% | 9.0% | 1.0% | 20.5% | 39.5% | 40% | 60% |
| T | | | 7.0% | 24.0% | 7.0% | 2.0% | 20.5% | 39.5% | 40% | 60% |

FIGURE 3

Table 3 Comparitive Chemistry: Predicted Versus Measured

| Chemistry | Percent Oxide or LOI | | | | | | | | | ppm, Hach |
|---|---|---|---|---|---|---|---|---|---|---|
| | SiO2 | Al2O3 | Fe2O3 | TiO2 | CaO | MgO | Na2O | K2O | LOI | SO4 |
| Predicted A | 65.72 | 21.67 | 0.46 | 0.84 | 0.51 | 0.10 | 2.51 | 1.97 | 5.95 | |
| Measured A | 66.15 | 21.98 | 0.47 | 0.86 | 0.56 | 0.14 | 2.60 | 1.83 | 5.75 | 196 |
| Predicted X-5 | 66.25 | 21.93 | 0.29 | 0.58 | 0.62 | 0.20 | 2.58 | 1.72 | 5.79 | |
| Measured X-5 | 66.04 | 21.62 | 0.30 | 0.56 | 0.59 | 0.20 | 2.69 | 1.70 | 5.57 | 76 |
| Predicted T | 66.11 | 21.96 | 0.34 | 0.57 | 0.55 | 0.22 | 2.61 | 1.87 | 5.70 | |
| Measured T | 66.25 | 21.80 | 0.33 | 0.58 | 0.64 | 0.30 | 2.67 | 1.68 | 5.75 | 74 |

FIGURE 4

Table 4
Properties of Slip Made with No Ball Clay

| Formula | Components, w/w% on Dry Basis | | | | | | | | | Slip Properties, 74% Solids (w/w%) | | | |
|---|---|---|---|---|---|---|---|---|---|---|---|---|---|
| | BCF | BCC | KD | KF | K6 | AG | A4 | Q | F | Surface Area, m2/gm | Viscosity cP, #2 @ 10 rpm | Sodium Silicate, SWF | Baroid, gm |
| Control A | 13.0 | 21.0 | | 17.0 | | | | 11.0 | 38.0 | 9.8 | 1,001 | 0.33 | 56.2 |
| Crown | | | 5.0 | 32.0 | | 0.5 | 2.0 | 19.5 | 41.0 | 8.5 | 1,120 | 0.29 | 90.2 |
| AG-3.5 | | | | 36.5 | | 3.5 | | 19.0 | 41.0 | 8.4 | 440 | 0.22 | 53.2 |
| AG-3.0 | | | | 33.0 | 5.0 | 3.0 | | 19.5 | 39.5 | 9.3 | 1,536 | 0.29 | 58.2 |
| X-4 | | | 12.0 | 20.0 | 7.0 | 1.0 | | 20.5 | 39.5 | 8.3 | 1,100 | 0.22 | 80.0 |
| X-5 | | | 9.0 | 21.0 | 9.0 | 1.0 | | 20.5 | 39.5 | 8.1 | 1,200 | 0.20 | 71.1 |
| X-3 | | | 9.5 | 20.0 | 10.0 | 0.5 | | 20.5 | 39.5 | 8.0 | 1,180 | 0.21 | 69.2 |
| ATTA 3 | | | | 36.5 | | 0.75 | 2.5 | 19.0 | 41.25 | N/A | 1,090 | 0.31 | 76.1 |
| X-2 | | | 10.0 | 20.0 | 9.0 | 1.0 | | 20.5 | 39.5 | 8.4 | 1,310 | 0.23 | 64.2 |
| X-7 | | | 5.5 | 24.0 | 9.0 | 1.5 | | 20.5 | 39.5 | 8.7 | 1,130 | 0.25 | 56.8 |
| T-M | | | 5.0 | 26.0 | 7.0 | 2.0 | | 20.5 | 39.5 | 8.6 | 1,047 | 0.21 | 55.8 |
| Y-1 | | | 5.0 | 25.0 | 10.0 | 1.0 | | 19.5 | 39.5 | 8.5 | 1,040 | 0.24 | 57.6 |
| T | | | 7.0 | 24.0 | 7.0 | 2.0 | | 20.5 | 39.5 | 9.0 | 1,120 | 0.21 | 52.3 |
| T-4 | | | 4.0 | 26.0 | 8.0 | 2.0 | | 20.5 | 39.5 | 9.0 | 1,160 | 0.25 | 50.9 |
| ATTA 4 | | | | 37.0 | | 2.0 | 2.0 | 19.0 | 40.0 | 10.2 | 700 | 0.35 | 51.2 |

Table 5

Properties of Castings Made with No Ball Clay

| Formula | Components, w/w on Dry Basis |||||||| Casting Properties |||
|---|---|---|---|---|---|---|---|---|---|---|---|
| | BCF | BCC | KD | KF | K6 | AG | A4 | Q | F | Green MOR psi | Fired MOR psi | Green Shrinkage % | Total Shrinkage % |
| Control A | 13.0% | 21.0% | | 17.0% | | | | 11.0% | 38.0% | 422 | 8,628 | 2.30 | 9.74 |
| Crown | | | 5.0% | 32.0% | | 0.5% | 2.0% | 19.5% | 41.0% | 222 | 10,323 | 1.34 | 11.29 |
| AG-3.5 | | | | 36.5% | | 3.5% | | 19.0% | 41.0% | 378 | 9,645 | 0.82 | 9.65 |
| AG-3.0 | | | | 33.0% | 5.0% | 3.0% | | 19.5% | 39.5% | 402 | 9,030 | 0.87 | 11.05 |
| X-4 | | | 12.0% | 20.0% | 7.0% | 1.0% | | 20.5% | 39.5% | 407 | 6,030 | 1.82 | 9.41 |
| X-5 | | | 9.0% | 21.0% | 9.0% | 1.0% | | 20.5% | 39.5% | 413 | 5,600 | 1.88 | 9.19 |
| X-3 | | | 9.5% | 20.0% | 10.0% | 0.5% | | 20.5% | 39.5% | 418 | 6,402 | 1.65 | 9.02 |
| ATTA 3 | | | | 36.5% | | 0.75% | 2.5% | 19.0% | 41.25% | 432 | 10,840 | 0.89 | 11.30 |
| X-2 | | | 10.0% | 20.0% | 9.0% | 1.0% | | 20.5% | 39.5% | 442 | 7,072 | 2.03 | 9.97 |
| X-7 | | | 5.5% | 24.0% | 9.0% | 1.5% | | 20.5% | 39.5% | 444 | 10,763 | 1.44 | 10.21 |
| T-M | | | 5.0% | 26.0% | 7.0% | 2.0% | | 20.5% | 39.5% | 472 | 9,064 | 1.47 | 10.39 |
| Y-1 | | | 5.0% | 25.0% | 10.0% | 1.0% | | 19.5% | 39.5% | 477 | 6,050 | 1.78 | 9.96 |
| T | | | 7.0% | 24.0% | 7.0% | 2.0% | | 20.5% | 39.5% | 510 | 8,688 | 1.57 | 10.33 |
| T-4 | | | 4.0% | 26.0% | 8.0% | 2.0% | | 20.5% | 39.5% | 550 | 9,008 | 1.06 | 10.19 |
| ATTA 4 | | | | 37.0% | | 2.0% | 2.0% | 19.0% | 40.0% | 622 | 8,430 | 0.44 | 10.20 |

FIGURE 5

COMPOSITION TO COMPLETELY OR PARTIALLY REPLACE BALL CLAY IN CERAMICS, METHOD OF MAKING, AND USE THEREOF

CROSS-REFERENCE TO RELATED APPLICATIONS

This application is a Divisional of U.S. patent application Ser. No. 16/610,164, filed (371c date) Nov. 1, 2019, which is a U.S. National Stage of International Application No. PCT/US2018/030856 filed on May 3, 2018, which claims priority of U.S. Application No. 62/647,657, filed on Mar. 24, 2018, and U.S. Application No. 62/502,032, filed on May 5, 2017, the entire disclosures of all which are hereby incorporated by reference.

FIELD

A composition which comprises at least one form of attapulgite present in a solid weight fraction amount ranging from 0.25% to 5%; kaolin present in a solid weight fraction amount ranging from 17% to 50%; and optionally Ball Clay in a solid weight fraction amount ranging from 0% to 25%. Although makeable by other processes, in some embodiments, the composition is makeable by mixing component ingredients. Although usable for other purposes, in some embodiments, the composition is used to make ceramic pieces, e.g., via casting, pressing, jiggering or jollying, especially when the ceramic formulation has solids, chemistry and viscosity suitable for shaping before drying, sintering, and optionally finishing.

A composition, in the form of powder(s), granules or prills; or in the form of a slurry; or in the form of a paste or filter cake that can be used to prepare a suspension, slip, or a pug which can be cast, pressed, jiggered or jollied into ceramic pieces, containing reduced concentration of, or no, Ball Clay, along with at least one kaolin, at least one form of attapulgite; ground quartz; ground feldspar, along with addition of dispersants and other additives. Although usable for other purposes, the composition is usable to prepare a slip or pug to cast, press, jigger or jolly ceramic pieces. Although makeable in other ways, the composition is makeable by blending the kaolin, the at least one form of attapulgite, and Ball Clay in the form of crude clay, dried clay, or slurried clay, or any combination of these, along with addition of quartz, feldspar, dispersants and other additives.

A composition, in the form of a ceramic body, with or without finishing, that has been cast, pressed, jiggered or jollied to form a ceramic piece using the inventions described. Introduction Ball Clays are a group of clays comprised of 20% to 80% kaolinite, 10% to 25% mica, 6% to 65% quartz and a variety of other minerals and carbonaceous materials (such as lignite) in smaller ratios. Because they were deposited in layers over time, there are sometimes large differences in mineral and chemical composition within a single deposit.

Ball Clays are used in ceramics for their plasticity.

Ball Clays are used in slips because of their ability to suspend high density minerals in slurries and slips.

Ball Clays are rare, being mined primarily in Kentucky, Tennessee, Mississippi and parts of England.

One disadvantage of Ball Clay is difficulty reaching a stable viscosity, without aging Ball Clay slurry for one to seven days prior to production of a full slip.

One disadvantage of Ball Clay is difficulty controlling casting rate of a slip to achieve a rapid casting.

One disadvantage of Ball Clay is difficulty in obtaining local sources in many parts of the world, raising the cost of ceramics produced with Ball Clay.

One disadvantage of using Ball Clay is the need to use 3 to 4 different Ball Clays along with 2 to 3 different kaolin clays to balance all the properties required of the plastic portion of a body formulation.

One difficulty replacing Ball Clay is maintaining plasticity, especially in cast and dry pieces (green strength) without affecting viscosity build and casting rate of the slip.

One difficulty replacing Ball Clay is maintaining fired strength without losing plasticity (green strength) or changing the percent shrinkage of a fired piece.

It is to be understood that both the foregoing general description and the following detailed description are representative and explanatory only and are not restrictive of the invention, as claimed.

The accompanying tables in the drawings, which are incorporated in and constitute a part of this specification, illustrate embodiments of the invention and together with the description, serve to explain the principles of the invention.

BRIEF DESCRIPTION OF THE DRAWINGS

The accompanying drawings, which are incorporated in and constitute a part of this specification, illustrate embodiments of the invention and together with the description, serve to explain the principles of the embodiments described herein.

FIG. 1 shows a component key.

FIG. 2 shows a SWF for components of embodiments.

FIG. 3 shows a comparison of theoretical and measured values of observables.

FIG. 4 shows a comparison of slips made without Ball Clay.

FIG. 5 shows properties of ceramic pieces.

DESCRIPTION OF THE EMBODIMENTS

The percent solids by weight (w/w %) is the weight of dry solids in a given volume of a composition divided by the total weight of the composition multiplied by 100%. w/w % is calculated using the following formula:

$$w/w\% = W_s/W_t \times 100\% \quad (1)$$

in which $W_s$ is the weight of dry solids in the composition, and $W_t$ is the total weight of the composition. For example, if the total weight of solids ($W_s$) in a composition is 75 g, and the total weight of composition ($W_t$) is 100 g, then the percent solids by weight w/w % is 75%.

The percent solid weight fraction of an ingredient of a composition ($SWF_i\%$) is the weight of the dry solid ingredient in a given volume of the composition divided by the total dry weight of all solids in that volume of the composition multiplied by 100%. The formula is:

$$SWF_i\% = W_{s,i}/W_s \times 100\% \quad (2)$$

in which $W_{s,i}$ is the weight of the dry solid ingredient in the composition having total weight $W_s$. For example, if the total weight of solids ($W_s$) in a composition is 100 g, and 2.0 g of which is ActiGel®208 ($W_{s,i}$), then for ActiGel®208, $SMF_{ActiGel®208}\% = 2.0\%$.

A composition comprises at least one form of attapulgite present in a solid weight fraction amount ranging from 0.25% to 5%; kaolin present in a solid weight fraction amount ranging from 17% to 50%; and optionally Ball Clay in a solid weight fraction amount ranging from 0% to 25%.

In some embodiments, the at least one form of attapulgite from a locality chosen from Palygorskaya, near the Popovka River, Perm, Russia; Attapulgus, Decatur Co., Georgia; at Tafraout, Morocco; and in the Hyderabad deposit, Andhra Pradesh, India. In some embodiments, the attapulgite is from Attapulgus, Decatur Co., Georgia. In some embodiments, the attapulgite is associated with other non-attapulgite minerals, such as montmorillonite, dolomite, calcite, talc, chlorite, quartz, and the like. In some embodiments, the attapulgite is substantially free of non-attapulgite minerals and is a purified hydrous magnesium alumino silicate. Such purified attapulgite (hydrous magnesium alumino silicate) is, in some embodiments, available by using the methods in U.S. Pat. Nos. 6,444,601 and 6,130,179, each of which is incorporated herein in its entirety.

In some embodiments, the attapulgite is a purified hydrous magnesium alumino silicate.

In some embodiments, the at least one form of attapulgite is chosen from attapulgites impoverished in smectite. Such impoverishment, in some embodiments, is obtained by dry processing. In some embodiments, the at least one form of attapulgite is from a dry-processed, finely-pulverized, gelling grade of bulk Mg-aluminosilicate clay chosen from the fuller's earth deposits in the Meigs-Quincy district near Attapulgus, Ga. For example, in some embodiments, the dry-processed attapulgite has not been purified for removal of smectite.

In some embodiments, the dry processed attapulgite is chosen from MIN-U-GEL® 200, MIN-U-GEL® 400, MIN-U-GEL® G-35, FG, FLORIGEL® HY, and MIN-U-GEL® MB. Each is available from Active Minerals International.

Attapulgite is sometimes referred to as salt gel or fuller's earth. In some embodiments, attapulgite is a hydrous magnesium aluminum-silicate produced in gel and absorbent grades.

In some embodiments, the attapulgite is MIN-U-GEL® or Florigel®.

In some embodiments, the one or more forms of attapulgite is MIN-U-GEL® and ACTI-GEL® 208.

In some embodiments, the at least one attapulgite is Liquid Acti-Gel® 208 or a slurry of attapulgite chosen from the fuller's earth deposits in the Meigs-Quincy district near Attapulgus, Ga.

In some embodiments, the one or more forms of attapulgite are added in the form of a slurry or pre-gel, consisting of the one or more forms of attapulgite and water. In some embodiments, the pre-gel consists of from 18% to 26% (w/w %) of the one or more forms of attapulgite by weight and the remainder water.

In some embodiments, the at least one attapulgite is unprocessed crude clay chosen from the fuller's earth deposits in the Meigs-Quincy district near Attapulgus, Ga.

In some embodiments, the at least one form of attapulgite is chosen from purified attapulgites, such as those noted herein, and dry processed attapulgites, such as those noted herein.

In some embodiments, the composition further comprises at least one second form of attapulgite present in an amount SWF ranging from 1% to 4.5%. For example, the amount of the at least one second form of attapulgite ranges from 1% to 4% or from 0.5% to 2%. When one second form of attapulgite is used its SWF is in addition to the SWF of the at least one form of attapulgite.

In some embodiments, the at least one second form of attapulgite is chosen from dry processed attapulgites, such as those noted herein.

In some embodiments, the at least one form of attapulgite is present in an amount SWF ranging from 1.0% to 5.0% or from 0.5% to 4.0% or from 0.25% to 2.0%.

In some embodiments, kaolin clay is chosen from inert hydrous aluminum silicate clay with MBI less than 5 (See ASTM C-837-09), and grit content less than 1%. In some embodiments, the kaolin is chosen from those in which less than or equal to 0.25 wt % of the material has a size greater than 47 µm or less than or equal to 0.12 wt % of the material has a size greater than 47 µm. In some embodiments, kaolin clay is chosen from inert hydrous aluminum silicate clay with MBI 7 to 15 or MBI 12 to 25.

In some embodiments, kaolin clay is chosen from inert hydrous aluminum silicate clay with a low surface area.

In some embodiments, kaolin clay is chosen from inert hydrous aluminum silicate clay with Baroid casting rate above 200 g and surface area below 10 m$^2$/g.

In some embodiments, the kaolin clay is chosen from crude, unprocessed kaolin in which less than 6% has a size greater than 47 µm.

In some embodiments, the kaolin clay is chosen from air float kaolin clays such as those obtained from Active Minerals International Acti-Min® line of air-floated kaolin clays.

In some embodiments, the kaolin clay is chosen from hard and soft clays. In some embodiments, the soft clay is air float kaolin. In some embodiments, the hard clay is reinforcement clay.

In some embodiments, the kaolin clay is chosen from ACTI-MIN® SA-1, ACTI-MIN® CR, ACTI-MIN® WC-5, ACTI-CAST® CM, ACTI-CAST® Coarse, ACTT-CAST® AF, ACTI-MIN® RP-2, ACTI-MIN® RP-80, ACTI-MIN® S1-R, ACTI-MIN® FE, CHAMPION®, and CROWN®.

In some embodiments, the kaolin is present in an amount SWF ranging from 32% to 38% or from 35% to 40% or from 38% to 48%.

In some embodiments, the Ball Clay is chosen from one or more sources in Kentucky, Tennessee and Mississippi.

In some embodiments, the Ball Clay is present in an amount SWF ranging from 2% to 17% or from 1% to 5.0% or from 7% to 15%.

In some embodiments, the composition further comprises at least one liquid. In some embodiments, the at least one liquid is water. In some embodiments, the liquid comprises water and at least one other liquid. In some embodiments, the water is present in an amount greater than 80% v/v relative to the total volume of the water plus the volume of the at least one other liquid. In some embodiments, the amount is greater than 90% v/v or 95% v/v or 99% v/v. In some embodiments, the amount ranges from 85% to 95% v/v or from 96% to 99% v/v.

In some embodiments, the at least one other liquid is an organic liquid. In some embodiments, the at least one other liquid is miscible with water or at least partially miscible with water. In some embodiments, the at least one other liquid is an alcohol.

In some embodiments, the composition further comprises quartz or feldspar.

In some embodiments, the Quartz is crystalline silica having a D90 of less than 75 µm or less than 45 µm. In some embodiments, the silica is chosen from quartz sand, sandstone, or flint pebbles.

In some embodiments, the Feldspar is sodium feldspar having a D90 of less than 75 µm or less than 45 µm. In some embodiments the Feldspar may be substituted with potassium feldspar, nepheline syenite or aplite. In some embodiments, the feldspar is chosen from aluminosilicates containing sodium (Na), potassium (K), and/or calcium (Ca).

In some embodiments, the composition further comprises a dispersant. In some embodiments, the dispersant is organic, such as polyacrylates and acrylic derivatives or polycarbonates. In some embodiments, the dispersant is inorganic, such as sodium silicates, phosphates and polyphosphates, sodium and potassium hydroxides, and sodium and potassium carbonates. In some embodiments, the dispersant is chosen from sodium silicate, tripolyphosphate pyrophosphate, tetraphosphate, and esametaphosphate. In some embodiments, the dispersant is chosen from tetrasodium pyrophosphate TSPP. In some embodiments, the composition is free of dispersant.

In some embodiments, the composition comprises additives, other than those noted above. In some embodiments, these additives are chosen from dispersants, surfactants, binders, coagulants, flocculants and pH modifiers.

In some embodiments, the composition further comprises dispersants such as those chosen from sodium silicate, tripolyphosphate pyrophosphate, tetraphosphate, and esametaphosphate disperants. The dispersant is present in an amount sufficient to maintain low viscosity at high solids content. In some embodiments, the dispersant is tetrasodium pyrophosphate TSPP.

In some embodiments, the composition further comprises one or more quaternary amines. In some embodiments, the one or more quaternary amines make it possible to maintain plasticity and increase cast rate, or to counteract the effects of high dispersant concentration.

Quaternary amines are commonly used as industrial and household disinfectants, or as surfactants, fabric softeners and anti-static agents, or in cosmetics and personal care items such as shampoos. They have not been used in the ceramic industry for control of casting rate and plasticity.

In some embodiments, the one or more quaternary amines are chosen from those of the following formula:

[N—R$_1$R$_2$R$_3$R$_4$]$^+$X$^-$, in which

N is nitrogen,

R$_1$-R$_4$ are independently chosen from C$_1$-C$_{50}$ alkyl groups (such as C$_1$ (methyl), C$_2$ (ethyl), C$_3$ (i-propyl or n-propyl), C$_4$, C$_5$, C$_6$, C$_8$, C$_{10}$, C$_{12}$, C$_{14}$, C$_{16}$, and C$_{18}$ and longer alkyl chains with up to 50 carbons) or an aryl group having from 6 to 14 carbon atoms and optionally linked with an alkyl spacer having C$_1$-C$_{18}$ (such as phenyl, benzyl, ethyl phenyl, C$_3$-C$_{18}$ phenyl), and X− is an anion, such as chloride, bromide, acetate and saccharinate.

In some embodiments, R$_1$-R$_4$ are the same. In some embodiments, R$_1$-R$_4$ differ. In some embodiments, some of R$_1$-R$_4$ are the same while other differ.

In some embodiments, the quaternary amines are chosen from those of the above formula in which R$_1$ is benzyl, R$_2$ and R$_3$ are methyl and R$_4$ is C$_8$-C$_{18}$, and optionally still X$^-$ is chloride.

In some embodiments, the quaternary amines are benzalkonium chloride, or distearyl dimethyl ammonium chloride or n-alkyl dimethyl benzyl chloride.

In some embodiment, the quaternary amines are chosen from babassuamidopropalkonium chloride, benzalkonium chloride, benzathonium chloride, grapefruit seed extract, methylbenzethonium chloride, cetalkonium chloride, vegetable oil quaternary, quaternium-15, stearalkonium chloride, polyquaternium, guar hydroxypropyltrimonium chloride, behentrimonium chloride, behentrimonium methosulfate.

Quaternary amines make it possible, in some embodiments, to increase cast rate of the composition from 50% to 150%.

Quaternary amines make it possible, in some embodiments, to allow for the composition to be fully dispersed to a low viscosity using organic or inorganic dispersants, or both types of dispersants, and then to be recovered to an acceptable casting rate and high plasticity.

Quaternary amines make it possible, in some embodiments, to bring a measure of plasticity, as determined by ease of cutting an object, into the same range as observed when cutting a traditional ball clay slip.

The composition, in some embodiments, to, when cast at high pressure, firms up sufficiently to be cut within minutes of removing from the mold.

When present, the one or more quaternary amines are present in a solid weight fraction (SWF) amount ranging from 0.005 to 0.025% or from 0.01 to 0.04% or from 0.02 to 0.5%.

In some embodiments, the composition further comprises one or more coagulants, such as inorganic coagulants or organic coagulants or a combination of both inorganic and organic coagulants. In some embodiments, the organic coagulants are chosen from polyamines, polyDADMAC, melamine formaldehyde, and tannins. In some embodiments, the inorganic coagulants are chosen from aluminum sulfate (alum), aluminum chloride, polyaluminum chloride (PACl), aluminum chlorohydrate (ACH), ferric sulfate, ferrous sulfate, and ferric chloride.

In some embodiments, the composition further comprises one or more flocculants, such as cationic or anionic flocculants. In some embodiments, the cationic flocculants are chosen from polymers and copolymers, such as copolymers of AETAC (N,N-dimethylaminoethyl acrylate methyl chloride quaternary) or METAC (N,N-dimethylaminoethyl methacrylate methyl chloride quaternary) and acrylamide. In some embodiments, the anionic flocculants are chosen from polymers and copolymers, such as copolymers of acrylamide and acrylic acid.

In some embodiments, the composition further comprises one or more pH modifiers. In some embodiments, the pH modifier is selected from gypsum, hydrated lime, ammonium nitrate, and aluminum sulfate. In some embodiments, the pH modifier is chosen from sodium hydroxide, caustic soda, hydrated lime, shell meal, limestone, burned lime, dolomite, sugar beet lime, and calcium silicate. In some embodiments, the pH modifier is chosen from aluminum sulfate, calcium sulfate, magnesium sulfate, Epsom salt, calcium chloride, lime sulfur, ferric sulfate, sulfuric acid, acetic acid, hydrochloric acid, sulfur, and gypsum. In some embodiments, the neutralizer is selected from gypsum, hydrated lime, ammonium nitrate, and aluminum sulfate.

In some embodiments, the composition is in a form chosen from aqueous suspensions or slurries, pugs, pastes, cakes, powders, granules, pellets, and prills.

As used herein, a suspension or slurry is a paste or liquid in which solid particles are partially or fully dispersed.

As used herein, a suspension is a liquid in which solid particles are dispersed. A slurry is a flowable suspension.

As used herein, a slip is a liquid in which substantially all the components of a ceramic body have been mixed. The solid particles of a slip or suspension are the solid particulates.

In some embodiments of an aqueous suspension, the liquid is water. In some embodiments, the liquid comprises water and at least one other liquid. In embodiments of an aqueous suspension, the water is present in an amount greater than 80% v/v relative to the total volume of the water plus the volume of the at least one other liquid. In some embodiments, the amount is greater than 90% v/v or 95% v/v or 99% v/v. In some embodiments, the amount ranges from 85% to 95% v/v or from 96% to 99% v/v.

In some embodiments, the aqueous suspension is a slurry, i.e., flowable.

As used herein, a slip is a liquid in which substantially all the components of a ceramic body have been mixed. The solid particles of a slip or suspension are the solid particulates.

In some embodiments, the aqueous suspension has a total percent solids by weight (w/w %) amount ranging from 60% to 74% or from 65% to 75%.

In some embodiments, the composition is in the form chosen from pugs or pastes. For example, the composition is mixed with water (as noted herein) and optionally at least one other liquid (as noted herein) to make a workable paste in a pug mill, before an optional extrusion.

In some embodiments, the composition has a form chosen from pugs, pastes or cakes having a total percent solids by weight (w/w %) amount ranging from 70% to 90% or from 75% to 85%.

In some embodiments, the composition is in the form of a pug having a total percent solids by weight (w/w %) amount ranging from 75% to 90% (w/w %) solids.

In some embodiments, the composition has a form chosen from powders, granules, pellets, and prills having a total percent solids by weight (w/w %) amount ranging from 85% to 100%.

The composition is makeable by mixing. In some embodiments, the ingredients of the composition are mixed. In some embodiments, mixing is facilitated by a mixer, such as a dry mixer such as a ribbon mixer, a cement mixer, a Mueller mixer, and the like.

In some embodiments, the ingredients of the composition are agitated to form a composition in the form of an aqueous slurry or suspension.

In some embodiments, the composition in the form of pug, cake, powder, granule, pellet or prill is mixed in water first, followed by addition of the non-plastic materials, if desired, and other materials; in some embodiments, the composition in the form of pug, cake, powder, granule, pellet or prill is added second or last. In some embodiments, the composition is not aged after addition to water or slurry. Order of addition is variable.

In some embodiments, the composition in the form of a slurry is not aged; in some embodiments, the composition in the form of a slurry is reduced in solids concentration (w/w %) prior to addition of other materials; in some embodiments, the composition in the form of a slurry is added to a slurry or paste of other materials. Order of addition is not critical.

In some embodiments, the composition is prepared by adding the one or more forms of attapulgite, the kaolin and the Ball Clay in the form of powder clay, a liquid or slurry, or crude unprocessed clay. In some embodiments the dispersant and other materials are added in the form of a liquid or slurry.

In some embodiments the composition is in the form of slurry. For example, the method of making the composition, in the form of a slurry, comprises mixing water, the at least one form of attapulgite, kaolin, Ball Clay, dispersant and other materials, and mixing to form a homogeneous composition at a viscosity below 1500 cP, or between 1600 and 2500 cP, or between 1200 and 1800 cP. In some embodiments, the mixing further comprises mixing a second form of attapulgite, and the composition in the form of slurry comprises at least one second form of attapulgite.

These are exemplary methods of making, and any composition described herein is makeable by mixing the ingredients and agitating described herein.

In some embodiments, the composition is prepared by adding the ingredients to a pug mixer to form a pug, paste or granules.

In some embodiments, the composition is prepared by producing slurry followed by filter pressing to make a press cake, or followed by spray drying to make granules, or followed by pin mixing to make granules.

In some embodiments, the storage of the composition in the form of slurry is for a period greater than 8 hours. In some embodiments, the storage is for a period ranging from 8 hours to 7 days. In some embodiments, the storage is for a period ranging from 3 to 6 days or from 4 to 5 days. In some embodiments, the storage is for 6 to 10 weeks during transport.

In some embodiments the slurry viscosity is altered by addition of dispersant after storage.

FIG. 1 contains Table 1, which gives the Key to abbreviations of components in Tables 2-5.

FIG. 2 contains Table 2, which shows the components of three formulas along with the resulting proportions of Plastic and non-Plastic components. Each component was measured by X-Ray Fluorescence (XRF) for main oxide chemistry; LOI was determined at 1000° C. and soluble $SO_4$ was determined by light transmission using a Hach meter.

A proprietary software model that uses the chemistry of the individual components to predict the chemistry of the full formula was used to compare measured oxide values to predicted oxide values.

FIG. 3 contains Table 3, which compares the chemical analysis predicted by the proprietary software of the three formulas in FIG. 2's Table 2 to the chemical analysis (XRF) as measured by an independent laboratory. Based on this comparison, oxide values predicted by the proprietary software are considered reasonable substitutes for measured values.

FIG. 4 contains Table 4, which compares slip properties of various formulas, all of which are predicted by the inventors to have chemistries similar to each other, as demonstrated by the three formulas in Table 3. Properties include Surface Area of the dry blend in $m^2/g$ measured by single point BET; Viscosity of a 74% (w/w %) solids slip measured with a #2 Brookfield spindle at 10 RPM; the concentration of sodium silicate (SWF) of the dry blend at the tested viscosity; the Baroid cake weight in grams after pressure filtering the slip (a measure of casting rate).

For example, similar viscosity was achieved with Formulas ATTA 3 and Y-1 compared to Control A, but dispersant demand was significantly lower and casting rate as indicated by Baroid was significantly higher.

The composition is useable to make ceramic pieces.

In some embodiments, the composition is formed into wet ceramic pieces having defined shapes. For example, a base composition is wet with water and optionally one other liquid until a desired level of viscosity, plasticity and moldability is attained (slip or slurry options may contain e.g., dispersants). In some embodiments, the wet ceramic pieces having defined shapes are formed by extruding the composition. In some embodiments, the wet ceramic pieces having defined shapes are formed by pressing the composition. In some embodiments, the wet ceramic pieces having defined shapes are formed by jiggering and/or jollying the composition. In some embodiments, the wet ceramic pieces having defined shapes are formed by casting the composition.

In some embodiments, the wet ceramic pieces having defined shapes are dryable to form a dried ceramic piece. In some embodiments, the wet ceramic pieces having defined shapes are dried to form a dried ceramic piece using tunnel drying or periodic drying.

In some embodiments, the dried ceramic pieces are sinterable via heat to form a ceramic piece. Sintering results in densification. In some embodiments, sintering via heat is accompanied by compressing the dried ceramic piece before sintering via heat.

The ceramic pieces are finishable. In some embodiments, the ceramic pieces are finished by lapping, grinding, polishing, and/or glazing. In some embodiments, the ceramic pieces are finished by lapping, grinding, and/or polishing.

In some embodiments glaze is applied before sintering and must shrink at a rate similar to that of the body during the sintering process to prevent cracking or crazing.

FIG. 5 contains Table 5, which compares properties of rods cast in gypsum molds of various formulas, all of which are predicted by the inventors to have similar chemistries as demonstrated by the three formulas in FIG. 3's Table 3. Properties include Green MOR and Fired MOR, both measurements of strength in psi at stages in the curing cycle; green shrinkage, and total shrinkage (sum of green and fired shrinkage).

For example, formulas T-M and X-7 provide higher green and fired strength compared to standard with marginally higher shrinkage.

A composition comprising kaolin, Ball Clay, the at least one form of attapulgite, quartz and/or feldspar, in some embodiments is makeable by blending a slurry capable of replacing some or most of the plastic and non-plastic components in a slip for casting.

A composition comprising kaolin, Ball Clay, the at least one form of attapulgite, quartz and/or feldspar, in some embodiments is makeable by blending a slurry capable of replacing some or most of the plastic and non-plastic components in a ceramic pug suitable for pressing, jiggering or jollying.

A composition comprising kaolin, Ball Clay, the at least one form of attapulgite, quartz and/or feldspar, in some embodiments is makeable by forming a pug or cake capable of replacing some or most of the plastic and non-plastic components in a slip for casting.

A composition comprising kaolin, Ball Clay, the at least one form of attapulgite, quartz and/or feldspar, in some embodiments is makeable by forming a pug or cake capable of replacing some or most of the plastic and non-plastic components in a ceramic pug suitable for pressing, jiggering or jollying.

A composition comprising kaolin, Ball Clay, the at least one form of attapulgite, quartz and/or feldspar, in some embodiments is makeable by forming a powder, granule, pellet or prill capable of replacing some or most of the plastic and non-plastic components in a slip for casting.

A composition comprising kaolin, Ball Clay, the at least one form of attapulgite, quartz and/or feldspar, in some embodiments is makeable by forming a powder, granule, pellet or prill capable of replacing some or most of the plastic and non-plastic components in a ceramic pug suitable for pressing, jiggering or jollying.

A composition, in the form of a powder, a granule or a prill having 90% to 100% (w/w %) solids; or in the form of a slurry having 60% to 78% (w/w %) solids; or in the form of a pug having 75% to 85% (w/w %) solids which, by replacing some or most of the plastic and non-plastic components of a slip, makes it possible to exhibit reduced aging requirements.

A composition, in the form of a powder, a granule or a prill having 90% to 100% (w/w %) solids; or in the form of a slurry having 60% to 78% (w/w %) solids; or in the form of a pug having 75% to 85% (w/w %) solids which, by replacing some or most of the plastic and non-plastic components of a slip, makes it possible to exhibit greater stability in viscosity and thixotropy.

A composition, in the form of a powder, a granule or a prill having 90% to 100% (w/w %) solids; or in the form of a slurry 60% to 78% (w/w %) solids; or in the form of a pug having 75% to 85% (w/w %) solids which, by replacing some or most of the plastic and non-plastic components of a slip, makes it possible to exhibit equal or greater casting rates compared to a traditional slip.

As known to the inventors, traditional slips and pugs comprise a plastic portion that includes Ball Clay and kaolin in a ratio of approximately 2:1; e.g., SWF of 30%:15%; or 34%:16% or; 37%:15%, along with other clay minerals and dispersants.

As known to the inventors, traditional slips and pugs comprise a non-plastic portion that includes ground silica and ground feldspar in a ratio of approximately 3:7; e.g., SWF of 11%:38%; or 10%:40%; 12%:42%, along with other minerals and additives.

As known to the inventors, traditional slips and pugs comprise plastic to non-plastic ratio of approximately 1:1; e.g., Plastic to non-plastic SWF ratio of 51%:49%; or 50%:50%; or 52%:48%; or 48%:52%, along with small additions of dispersants, additives and other plastic or non-plastic minerals.

All solids in a slip are present in solids fraction of approximately 65% to 75% (w/w %). Applications of a slip include, but are not limited to, casting sanitaryware, electrical porcelain and certain types of tableware.

All solids in a pug or cake are present in solids fraction of approximately 75% to 85% (w/w %). Applications include, but are not limited to pressed tile and craft ware.

A composition comprising kaolin, Ball Clay, and the at least one form of attapulgite, in some embodiments, is a blended slurry capable of replacing some or the entire plastic component in a slip for casting.

A composition comprising the at least one form of attapulgite, kaolin and Ball Clay, in some embodiments, is a blended slurry capable of replacing some or the entire plastic component in a ceramic pug suitable for pressing, jiggering or jollying.

A composition comprising the at least one form of attapulgite, kaolin and Ball Clay, in some embodiments, is a pug or cake capable of replacing some or the entire plastic component in a slip for casting.

A composition comprising the at least one form of attapulgite, kaolin and Ball Clay, in some embodiments, is a pug or cake capable of replacing some or all of the plastic component in a ceramic pug suitable for pressing, jiggering or jollying.

A composition comprising the at least one form of attapulgite, kaolin and Ball Clay, in some embodiments, is a powder, granule, pellet or prill capable of replacing some or all of the plastic component in a slip for casting.

A composition comprising the at least one form of attapulgite, kaolin and Ball Clay, in some embodiments, is a powder, granule, pellet or prill capable of replacing some or all of the plastic component in a ceramic pug suitable for pressing, jiggering or jollying.

A composition in the form chosen from powders, granules, and prills having 90% to 100% (w/w %) solids; or in the form of a slurry having 60% to 78% (w/w %) solids; or in the form of a pug having 75% to 85% (w/w %) solids which, by replacing the plastic component of a slip makes it possible (1) to reduce aging requirements; (2) to exhibit greater stability in viscosity and thixotropy; and/or (3) to exhibit equal or greater casting rates compared to a traditional slip.

Other embodiments of the invention will be apparent to those of ordinary skill in the art from consideration of the specification and practice of the embodiments disclosed herein. It is intended that the specification and examples be considered as non-limiting, with a true scope and spirit of the invention being indicated by the following claims.

What is claimed is:

1. A composition, comprising:
   one or more quaternary amines;
   at least one form of attapulgite present in a solid weight fraction (SWF) amount ranging from 0.25% to 5%;
   kaolin present in a solid weight fraction (SWF) amount ranging from 17% to 50%;
   Ball Clay present in a solid weight fraction (SWF) amount ranging from 0% to 25%; and
   one or more ingredients selected from silica, feldspar, and nepheline syenite.

2. The composition of claim 1, wherein the at least one form of attapulgite is present in an amount SWF ranging from 0.5% to 4.0%.

3. The composition of claim 1, wherein the at least one form of attapulgite is a processed attapulgite impoverished in smectite relative to a corresponding unprocessed attapulgite that was processed to form the processed attapulgite.

4. The composition of claim 1, wherein the at least one form of attapulgite is chosen from purified attapulgite and dry processed attapulgite.

5. The composition of claim 1, wherein the at least one form of attapulgite is chosen from attapulgite slurry or unprocessed crude attapulgite.

6. The composition of claim 1, wherein the kaolin is present in an amount SWF ranging from 35% to 45%.

7. The composition of claim 1, wherein the total percent solids by weight (w/w %) amount in the composition ranges from 60% to 99%.

8. A composition, comprising:
   one or more quaternary amines;
   at least one form of attapulgite present in a solid weight fraction (SWF) amount ranging from 0.25% to 5%;
   kaolin present in a solid weight fraction (SWF) amount ranging from 17% to 50%;
   Ball Clay present in a solid weight fraction (SWF) amount ranging from 0% to 25%; and
   at least one second form of attapulgite present in an amount SWF ranging from 0.25% to 4%.

9. The composition of claim 8, wherein the at least one form of attapulgite is chosen from purified attapulgite; and wherein the at least one second form of attapulgite is chosen from dry processed attapulgite, unprocessed crude attapulgite or attapulgite slurry.

10. The composition of claim 1, wherein the composition is in a form chosen from aqueous slurries, suspensions, pugs, pastes, cakes, powders, granules, pellets, and prills.

11. The composition of claim 1, wherein the composition has a form chosen from aqueous suspensions having a total percent solids by weight (w/w %) amount ranging from 60% to 74%.

12. The composition of claim 1, wherein the composition has a form chosen from pugs, cakes and pastes having a total percent solids by weight (w/w %) amount ranging from 70% to 90%.

13. The composition of claim 1, wherein the composition has a form chosen from powders, granules, pellets, and prills having a total percent solids by weight (w/w %) amount ranging from 85% to 100%.

14. A method of making a composition of claim 1, comprising mixing one or more quaternary amines, at least one form of attapulgite, kaolin, optionally Ball Clay, and silica, feldspar, and nepheline syenite.

15. The method of claim 14, comprising mixing one or more quaternary amines, a liquid, at least one form of attapulgite, kaolin, and optionally Ball Clay to make a mixture.

16. The method of claim 15, wherein the liquid comprises water.

17. The method of claim 16, wherein the mixture is agitated to form a slurry or suspension, and the composition is in the form of an aqueous slurry or suspension.

18. The method of claim 15, wherein the liquid further comprises at least one organic liquid.

19. The method of claim 14, further comprising mixing silica, feldspar, and nepheline syenite with the one or more quaternary amines, at least one form of attapulgite, kaolin, and optionally Ball Clay.

20. The composition of claim 1, wherein the composition comprises silica.

* * * * *